(12) United States Patent
Lee

(10) Patent No.: US 8,296,795 B2
(45) Date of Patent: Oct. 23, 2012

(54) METHOD FOR TUNING TO CHANNEL AND BROADCAST RECEIVING APPARATUS USING THE SAME

(75) Inventor: Joo-yeon Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 712 days.

(21) Appl. No.: 12/212,073

(22) Filed: Sep. 17, 2008

(65) Prior Publication Data

US 2009/0083791 A1    Mar. 26, 2009

Related U.S. Application Data

(60) Provisional application No. 60/974,261, filed on Sep. 21, 2007.

(30) Foreign Application Priority Data

Nov. 14, 2007  (KR) .................... 10-2007-0116156

(51) Int. Cl.
*H04N 5/445*    (2011.01)
*H04N 7/18*    (2006.01)
*G06F 3/00*    (2006.01)
*G06F 13/00*    (2006.01)

(52) U.S. Cl. ............... 725/38; 725/74; 725/78; 725/82; 725/84

(58) Field of Classification Search .................... 725/39, 725/48–50, 54, 74, 78, 82–85, 86, 89, 91, 725/93, 100, 114–115, 122, 135, 138–139, 725/144; 348/731, 732
See application file for complete search history.

(56) References Cited

U.S. PATENT DOCUMENTS 6,978,471 B1 *  12/2005  Klopfenstein .................. 725/50
2003/0140345 A1 *  7/2003  Fisk et al. ..................... 725/78

FOREIGN PATENT DOCUMENTS

KR    10-2006-0101645 A    9/2006

* cited by examiner

*Primary Examiner* — Hai V Tran
(74) *Attorney, Agent, or Firm* — Sughrue Mion, PLLC

(57) ABSTRACT

A channel tuning method and a broadcast receiving apparatus using the same are provided. The channel tuning method includes receiving a channel selection command from a user, tuning to a predetermined broadcast signal using channel index information corresponding to selected channel information, and displaying the tuned broadcast signal. The channel index information includes physical transmission channel (PTC) information, and program number information which is contained in a program map table (PMT). Therefore, it is possible to simultaneously manage a plurality of broadcast receiving apparatuses using separate channel index information corresponding to channel information input to the broadcast receiving apparatuses.

11 Claims, 4 Drawing Sheets

| Channel Index Information | 7-1 | 8-5 | 8-6 | 8-7 | 9-1 | 10-1 | 10-2 |
|---|---|---|---|---|---|---|---|
| Virtual Channel Information | 50 | 51 | 52 | 53 | 54 | 55 | 56 |

FIG. 3

| Channel Index Information | 7-1 | 8-5 | 8-6 | 8-7 | 9-1 | 10-1 | 10-2 |
|---|---|---|---|---|---|---|---|
| Virtual Channel Information | 50 | 51 | 52 | 53 | 54 | 55 | 56 | ns, such an automatic channel tuning mode is not
METHOD FOR TUNING TO CHANNEL AND BROADCAST RECEIVING APPARATUS USING THE SAME

CROSS-REFERENCE TO RELATED APPLICATIONS

This application claims priority from U.S. Provisional Patent Application No. 60/974,261 filed on Sep. 21, 2007, in the United States Patent and Trademark Office, and from Korean Patent Application No. 10-2007-0116156, filed on Nov. 14, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to receiving a broadcast, and more particularly, to tuning to a channel and receiving a broadcast through the channel.

2. Description of the Related Art

As a result of the recent developments in broadcasting, a variety of broadcasting, such as general ground wave broadcasting, cable broadcasting by wire, or satellite broadcasting, has been provided. Additionally, as broadcast signals have also become digitized, digital broadcasting has come to provide programs through a considerable number of channels, compared to conventional analog broadcasting, which provides programs through only ten channels or fewer.

Since a large number of channels are now provided, broadcast receiving apparatuses need to be operated in automatic channel tuning mode, in which tunable broadcast channels are detected automatically and the detected channels are stored in memories, so that users may tune to channels by changing to a higher or lower channel or by inputting a certain channel number using remote controllers.

However, such an automatic channel tuning mode is not included in broadcast receiving apparatuses installed in hotels in order to facilitate management of hotels. For example, if the automatic channel tuning mode is executed in broadcast receiving apparatuses installed in hotels, it may be difficult for hotel managers to check which customers view paid broadcast programs, because the number of broadcast channels is not fixed in digital broadcasting, in contrast to conventional analog broadcasting.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method for tuning to channels, and a broadcast receiving apparatus using the method, in which it is possible to simultaneously manage a plurality of broadcast receiving apparatuses using separate channel index information corresponding to channel information input to the broadcast receiving apparatuses by a user.

According to an aspect of the present invention, there is provided a channel tuning method of a broadcast receiving apparatus, the method comprising receiving a channel selection command from a user; tuning to a predetermined broadcast signal using channel index information corresponding to selected channel information; and displaying the tuned broadcast signal, wherein the channel index information comprises physical transmission channel (PTC) information, and program number information which is contained in a program map table (PMT).

The method may further comprise, if the channel selection command is received, transmitting the selected channel information to an external apparatus; and receiving the channel index information from the external apparatus.

It may be that the broadcast receiving apparatus does not have an automatic scanning function.

The tuning may further comprise tuning to a broadcast signal corresponding to the PTC; and tuning to a broadcast signal corresponding to the program number information contained in the PMT from among the tuned broadcast signals.

The tuning may further comprise, if the program number information is 0, tuning to an analog broadcast signal; and if the program number information is not 0, tuning to a digital broadcast signal.

According to another aspect of the present invention, there is provided a channel tuning method of a broadcast system comprising a server and a broadcast receiving apparatus, the method comprising, if a channel selection command is received, transmitting selected channel information from the broadcast receiving apparatus to the server; transmitting channel index information corresponding to the selected channel information from the server to the broadcast receiving apparatus; and tuning to a predetermined broadcast signal using the channel index information, by the broadcast receiving apparatus.

The channel index information may comprise physical transmission channel (PTC) information, and program number information which is contained in a program map table (PMT).

According to yet another aspect of the present invention, there is provided a channel tuning method of a broadcast system, the method comprising receiving channel information from an external apparatus; and transmitting channel index information corresponding to the received channel information to the external apparatus, wherein the channel index information comprises physical transmission channel (PTC) information, and program number information which is contained in a program map table (PMT).

According to yet another aspect of the present invention, there is provided a broadcast receiving apparatus comprising a broadcast receiver which tunes to a broadcast signal; and a controller which controls the broadcast receiver to tune to a predetermined broadcast signal using channel index information corresponding to selected channel information, if a channel selection command is received, wherein the channel index information comprises physical transmission channel (PTC) information, and program number information which is contained in a program map table (PMT).

The broadcast receiving apparatus may further comprise an interface which performs data communication with an external apparatus. If the channel selection command is received, the controller may control the interface to transmit the selected channel information to the external apparatus and to receive the channel index information from the external apparatus.

It may be that the broadcast receiving apparatus does not have an automatic scanning function.

The controller may control the broadcast receiver to tune to a broadcast signal corresponding to the PTC, and to tune to a broadcast signal corresponding to the program number information contained in the PMT from among the tuned broadcast signals.

The controller may control the broadcast receiver to tune to an analog broadcast signal if the program number information is 0, and to tune to a digital broadcast signal if the program number information is not 0.

According to yet another aspect of the present invention, there is provided a broadcast system comprising a server and a broadcast receiving apparatus. The broadcast receiving apparatus may comprise an interface which performs data communication with the server; and a controller which controls the interface to transmit selected channel information to the server and to receive channel index information corresponding to the selected channel information from the server, if a channel selection command is received.

The channel index information may comprise physical transmission channel (PTC) information, and program number information which is contained in a program map table (PMT).

BRIEF DESCRIPTION OF THE DRAWINGS

The above and/or other aspects of the present invention will be more apparent by describing certain exemplary embodiments of the present invention with reference to the accompanying drawings, in which:

FIG. 3 is a channel index table stored in a server, according to an exemplary embodiment of the present invention.

DETAILED DESCRIPTION OF EXEMPLARY EMBODIMENTS

Figure 1:
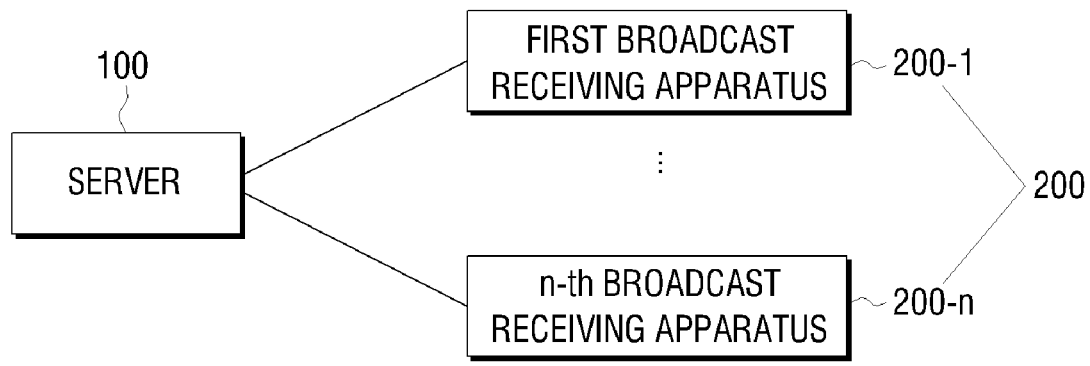
FIG. 1 is a schematic block diagram of a hotel broadcast system according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 schematically shows a hotel broadcast system according to an exemplary embodiment of the present invention. The hotel broadcast system of FIG. 1 comprises a server 100 and a plurality of broadcast receiving apparatuses 200. The plurality of broadcast receiving apparatuses 200 may be installed in different rooms of a hotel, and the server 100 may be physically detached from the broadcast receiving apparatuses 200. Each broadcast receiving apparatus 200 may perform data communication with the server 100 according to a communication standard, such as a recommended standard (RS)-232, or local area network (LAN) or high-definition multimedia interface (HDMI) consumer electronic control (CEC) standards.

The server 100 stores a channel index table. If a user inputs a channel selection command using a remote controller and the like, the broadcast receiving apparatus 200 may transmit selected channel information to the server 100. The server 100 may then read channel index information corresponding to the selected channel information from the pre-stored channel index table, and may transmit the read channel index information to the broadcast receiving apparatus 200. Subsequently, the broadcast receiving apparatus 200 may tune to a broadcast signal of a predetermined channel using the received channel index information and may display the tuned broadcast signal. Accordingly, the server 100 may desirably store the channel index table in order to provide channel index information corresponding to a channel selected by a user to the broadcast receiving apparatuses 200. In this case, an administrator of the server 100 may store the channel index table in the server 100.

Therefore, the channel index table may be transmitted from a single server 100 to the plurality of broadcast receiving apparatuses 200, so it is easier to manage the broadcast system.

Figure 2:
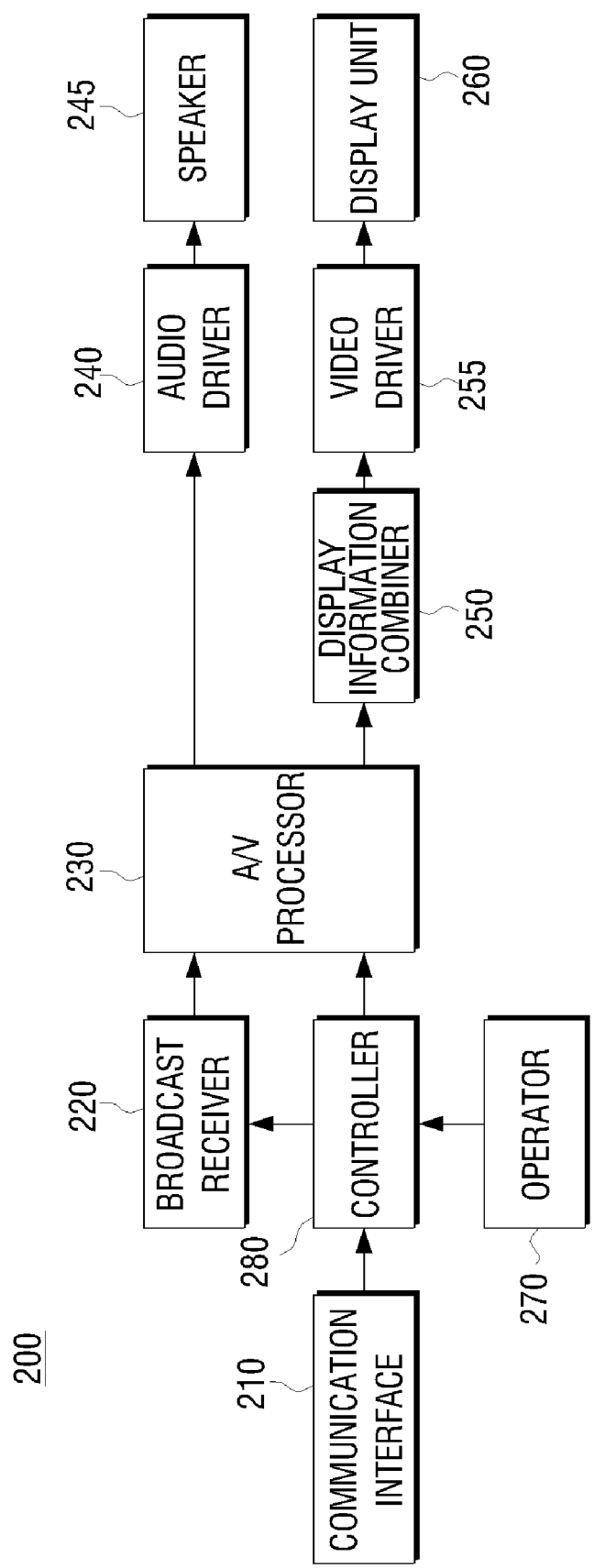
FIG. 2 is a block diagram of a broadcast receiving apparatus according to an exemplary embodiment of the present invention.

FIG. 2 is a block diagram of the broadcast receiving apparatus 200 according to an exemplary embodiment of the present invention. The broadcast receiving apparatus 200 of FIG. 2 comprises a communication interface 210, a broadcast receiver 220, an audio/video (A/V) processor 230, an audio driver 240, a speaker 245, a display information combiner 250, a video driver 255, a display unit 260, an operator 270 and a controller 280.

The communication interface 210 performs data communication with the server 100. Specifically, the communication interface 210 transmits virtual channel information to the server 100, receives channel index information corresponding to the virtual channel information from the server 100, and then transfers the received channel index information to the controller 280.

Here, the virtual channel information indicates channel numbers optionally set by an administrator of the broadcast system, and differs from information regarding a physical transmission channel (PTC), major channels and minor channels. Additionally, the channel index information corresponding to the virtual channel information includes PTC information, and program number information contained in a program map table (PMT).

The communication interface 210 may also receive video data from the server 100. When the communication interface 210 performs data communication with the server 100, a communication standard is used such as RS-232, LAN or HDMI-CEC standards.

The broadcast receiver 220 receives a broadcast signal via an antenna or a cable. The broadcast receiver 220 receives a predetermined broadcast signal on a channel using the channel index information transferred from the controller 280. Specifically, the broadcast receiver 220 tunes to a frequency of a PTC using the PTC information from among the channel index information, and then receives a broadcast signal using PMT data, which contains program number information, from among the channel index information.

The A/V processor 230 processes data (for example, a video signal or an audio signal) transferred from the communication interface 210 or broadcast receiver 220 so that the data can be played back. Additionally, the A/V processor 230 sends the video signal and the audio signal to the display information combiner 250 and the audio driver 240, respectively.

The audio driver 240 outputs the audio signal output from the A/V processor 230 through the speaker 245.

The display information combiner 250 combines display information, such as characters, symbols, figures and graphics, with the video output from the A/V processor 230. In this case, the display information combiner 250 can combine the display information with the video by using an on-screen display (OSD) method. The combining operation of the display information combiner 250 is controlled by the controller 280.

The video driver 255 displays the video combined with the display information output from the display information combiner 250 on the display unit 260.

The operator 270 may be provided integrally with or separately from the broadcast receiving apparatus 200, and may receive operating commands from a user and transmit the commands to the controller 280. Additionally, the operator 270 may be implemented as a user interface through which a user can enter the commands using a menu screen. The operator 270 may also comprise a remote controller whereby a user may input the operating commands, and a light receiver which receives an output signal of the remote controller to transmit the signal to the controller 280. The remote controller may include number keys "0" to "9", or up/down/left/right direction keys "▲/▼/◄/►".

The controller 280 controls the operation of the broadcast receiving apparatus 200 according to the operating commands of a user which are entered through the operator 270. If a virtual channel selection command is input through the operator 270, the controller 280 may control the communication interface 210 so that selected virtual channel information may be transmitted to the server 100. The controller 280 may determine whether channel index information corresponding to the selected virtual channel information is received via the communication interface 210. If it is determined that the channel index information is received, the controller 280 may transfer the channel index information together with a broadcast signal receiving command to the broadcast receiver 220. Subsequently, the controller 280 may control various function blocks of the broadcast receiving apparatus 200 so that a predetermined broadcast signal may be received according to the channel index information and the received broadcast signal may be displayed.

FIG. 3 shows an example of the channel index table stored in the server 100 to which the present invention is applicable. The channel index information shown in FIG. 3 comprises the PTC information, and the program number information contained in the PMT. The virtual channel information input by a user of the broadcast receiving apparatus 200 may be numbers optionally set by an administrator of the broadcast receiving apparatus 200. For example, if a user inputs a command to select a virtual channel number "50", the broadcast receiving apparatus 200 may transmit information on the virtual channel number "50" to the server 100. A controller (not shown) of the server 100 may read channel index information "7-1" corresponding to the virtual channel number "50" from the channel index table stored in the server 100, and may transmit the read channel index information "7-1" to the broadcast receiving apparatus 200. Here, "7" from among the channel index information "7-1" indicates PTC information, and "1" indicates a program number in the PMT. Subsequently, the broadcast receiving apparatus 200 may receive a broadcast signal corresponding to the channel index information "7-1", and may then provide a broadcast.

Figure 4:
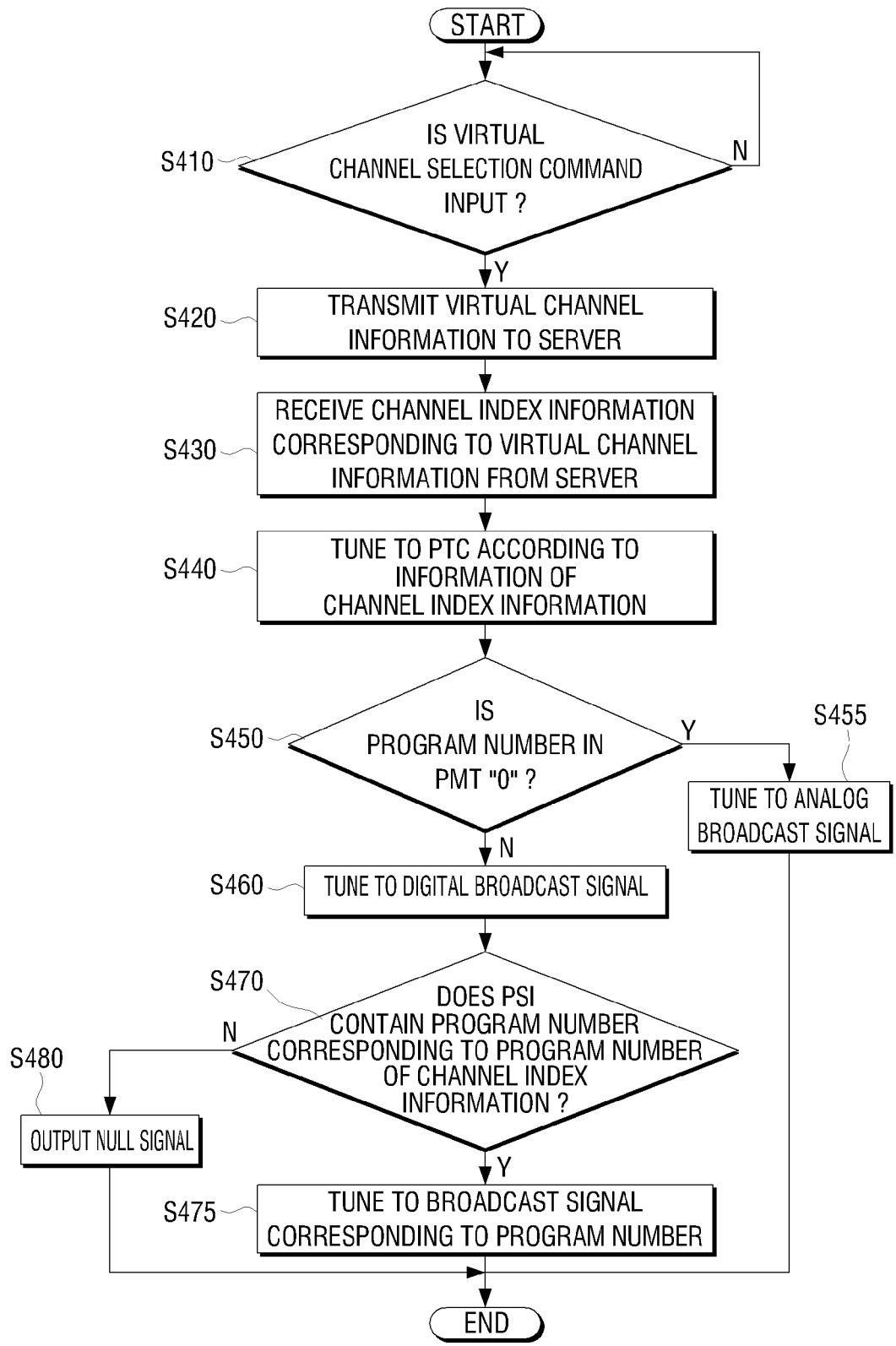
FIG. 4 is a flowchart illustrating a method for tuning to a broadcast signal according to channel index information when a user inputs a virtual channel selection command, according to an exemplary embodiment of the present invention.

Hereinafter, a process by which the broadcast receiving apparatus 200 of FIG. 2 tunes to a channel will be described in detail with reference to FIG. 4. FIG. 4 is a flowchart illustrating a method for tuning to a broadcast signal according to channel index information when the user inputs the virtual channel selection command, according to an exemplary embodiment of the present invention.

In FIG. 4, if the virtual channel selection command is input (S410-Y), the controller 280 may transmit selected virtual channel information to the server 100 via the communication interface 210 (S420). The server 100 may then read channel index information corresponding to the virtual channel information from the channel index table previously stored in the server 100, and may transmit the read channel index information to the broadcast receiving apparatus 200. In this situation, the channel index information may comprise the PTC information, and the program number information contained in the PMT.

The broadcast receiving apparatus 200 may receive the channel index information corresponding to the virtual channel information from the server 100 (S430). Specifically, if the communication interface 210 receives the channel index information from the server 100 and transfers the received channel index information to the controller 280, the controller 280 may transfer the channel index information along with the broadcast signal receiving command to the broadcast receiver 220.

The broadcast receiver 220 of the broadcast receiving apparatus 200 may tune to a predetermined PTC according to the PTC information contained in the channel index information (S440).

The broadcast receiver 220 may then determine whether a program number is "0" in the PMT of the channel index information (S450).

If it is determined that the program number is "0" (S450-Y), the broadcast receiver 220 may tune to an analog broadcast signal from the PTC (S455).

If it is determined that the program number is not "0" (S450-N), the broadcast receiver 220 may tune to a digital broadcast signal from the PTC (S460).

Subsequently, the broadcast receiver 220 may parse program specific information (PSI) from among digital data, and may determine whether the PSI contains a program number corresponding to the program number transferred from the controller 280 (S470).

If it is determined that the PSI contains a program number corresponding to the program number transferred from the controller 280 (S470-Y), the broadcast receiver 220 may tune to a broadcast signal corresponding to the program number, and may then transfer the tuned broadcast signal to the A/V processor 230 (S475). Alternatively, if it is determined that the PSI does not contain a program number corresponding to the program number transferred from the controller 280 (S470-N), the broadcast receiving apparatus 200 may output a null signal (S480).

For example, if the user inputs a command to select a virtual channel number "51", the server 100 may transmit channel index information "8-2" corresponding to the virtual channel number "51" to the broadcast receiving apparatus 200. The broadcast receiver 220 may tune to a channel "8", namely a PTC. In this situation, the program number is not "0", so the broadcast receiver 220 may tune to digital data on the channel "8", and may parse the PSI. Subsequently, the broadcast receiver 220 may determine whether a program number "2" is contained in the parsed PSI. If it is determined that a program number "2" is contained in the parsed PSI, the broadcast receiver 220 may receive a broadcast signal corresponding to the program number "2" from among the digital data and may transfer the received broadcast signal to the A/V processor 230, and if not, the broadcast receiver 220 may transfer the tuned data to the A/V processor 230.

As described above, since the channel index information comprises the PTC information and the program number information in the PMT, it is possible to reduce errors occurring while broadcast signals are being received, rather than the channel index information being set to major or minor channel numbers. This is because each broadcast signal from central and provincial broadcast stations is received using different PTCs and using the same major and minor channel, so if the broadcast receiving apparatus 200 is installed in a place where it is possible to receive broadcast signals from central and provincial broadcast stations, errors may arise while broadcast signals are received. However, the channel index information comprising the PTC information and the program number information in the PMT may assign a pre-determined broadcast signal, so errors occurring during reception of broadcast signals may be minimized.

Although the broadcast receiving apparatus 200 is used as a broadcast receiving apparatus installed in a hotel according to the exemplary embodiment of the present invention, the present invention may be applied to any broadcast receiving apparatus capable of being managed using the server 100 disposed separately from a plurality of broadcast receiving apparatuses.

As described above, according to the exemplary embodiment of the present invention, it is possible to simultaneously manage a plurality of broadcast receiving apparatuses using separate channel index information corresponding to channel information input to the broadcast receiving apparatuses.

Additionally, the channel index information comprises the PTC information and the program number information in the PMT, so it is possible to reduce errors occurring while broadcast signals are being tuned using the channel index information.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A channel tuning method of a hotel broadcast receiving apparatus, the method comprising:
receiving a channel selection command from a user by the hotel broadcasting receiving apparatus which is installed in one of hotel rooms;
tuning to a predetermined broadcast signal using channel index information corresponding to selected channel information, which is provided from a hotel server; and
displaying the tuned broadcast signal,
wherein the channel index information comprises a virtual channel information which indicates channel numbers set by an administrator of the hotel server and said channel numbers are in a relationship with physical transmission channel (PTC) information and program number information which is contained in a program map table (PMT),
wherein the hotel server stores the channel index information in a channel index table and provides, to the broadcast receiving apparatus, the physical transmission channel information corresponding to the selected channel information provided by the broadcast receiving apparatus, and
wherein the displaying comprises the broadcast receiving apparatus tuning to the tuned broadcast signal of a predetermined channel corresponding to the obtained physical transmission channel information provided from the broadcast providing apparatus.

2. The method as claimed in claim 1, wherein the broadcast receiving apparatus does not have an automatic scanning function.

3. The method as claimed in claim 1, wherein the tuning further comprises:
tuning to a broadcast signal corresponding to the program number information contained in the PMT from among the tuned broadcast signals.

4. The method as claimed in claim 3, wherein the tuning further comprises:
if the program number information is 0, tuning to an analog broadcast signal; and
if the program number information is not 0, tuning to a digital broadcast signal.

5. A channel tuning method of a hotel broadcast system comprising a server and a plurality of broadcast receiving apparatuses installed in different rooms of the hotel, the method comprising:
if a channel selection command is received, transmitting selected channel information from one of the plurality of the broadcast receiving apparatuses to the server;
transmitting channel index information corresponding to the selected channel information from the server to said one broadcast receiving apparatus; and
tuning to a predetermined broadcast signal using the channel index information, by said one broadcast receiving apparatus,
wherein the channel index information comprises a virtual channel information which indicates channel numbers set by an administrator of said server and said channel numbers are in a relationship with physical transmission channel (PTC) information and program number information which is contained in a program map table (PMT),
wherein the server stores the channel index information in a channel index table and provides the physical transmission channel information corresponding to the selected channel information provided by said one broadcast receiving apparatus, and
wherein said one broadcast receiving apparatus tunes to a broadcast signal of a predetermined channel corresponding to the obtained physical transmission channel information provided from the broadcast providing apparatus.

6. A broadcast receiving apparatus of a hotel broadcast system comprising a plurality of broadcast receiving apparatuses and a server; the broadcast receiving apparatus comprising:
a broadcast receiver which tunes to a broadcast signal; and
a controller which controls the broadcast receiver to tune to a predetermined broadcast signal using channel index information corresponding to selected channel information received from the server, if a channel selection command is received,
wherein the channel index information comprises a virtual channel information which indicates channel numbers set by an administrator of said server and said channel numbers are in a relationship with physical transmission channel (PTC) information and program number information which is contained in a program map table (PMT), wherein the server stores the channel index information in a channel index table and provides the physical transmission channel information corresponding to the selected channel information provided by the broadcast receiving apparatus, and wherein the broadcast receiver tunes to a broadcast signal of a predetermined channel corresponding to the obtained physical transmission channel information provided from the broadcast providing apparatus.

7. The broadcast receiving apparatus as claimed in claim 6, further comprising an interface which performs data communication with the server, wherein, if the channel selection command is received, the controller controls the interface to transmit the selected channel information to the server and to receive the channel index information from the server.

8. The broadcast receiving apparatus as claimed in claim 6, wherein the broadcast receiving apparatus does not have an automatic scanning function.

9. The broadcast receiving apparatus as claimed in claim 6, wherein the controller controls the broadcast receiver to tune to a broadcast signal corresponding to the program number information contained in the PMT from among the tuned broadcast signals.

10. The broadcast receiving apparatus as claimed in claim 9, wherein the controller controls the broadcast receiver to tune to an analog broadcast signal if the program number information is 0, and to tune to a digital broadcast signal if the program number information is not 0.

11. A hotel broadcast system comprising:

a server; and a plurality of broadcast receiving apparatuses in which the plurality of broadcast receiving apparatuses are installed in different rooms of a hotel, wherein at least one of the broadcast receiving apparatuses comprises:

an interface which performs data communication with the server; and a controller which controls the interface to transmit selected channel information to the server and to receive from the server channel index information corresponding to the selected channel information, if a channel selection command is received, wherein the channel index information comprises a virtual channel information which indicates channel numbers set by an administrator of said server and said channel numbers are in a relationship with physical transmission channel (PTC) information and program number information which is contained in a program map table (PMT), wherein the server stores the channel index information in a channel index table and provides the physical transmission channel information corresponding to the selected channel information provided by the at least one of the broadcast receiving apparatus, and wherein the at least one of the broadcast receiving apparatuses tunes to a broadcast signal of a predetermined channel corresponding to the obtained physical transmission channel information provided from the broadcast providing apparatus.

* * * * *